United States Patent
Cakulev et al.

(10) Patent No.: US 8,621,650 B2
(45) Date of Patent: Dec. 31, 2013

(54) VERIFICATION OF CONTENT POSSESSION BY AN ANNOUNCING PEER IN A PEER-TO-PEER CONTENT DISTRIBUTION SYSTEM

(75) Inventors: Violeta Cakulev, Millburn, NJ (US); Semyon B. Mizikovsky, Morganville, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/344,826

(22) Filed: Jan. 6, 2012

(65) Prior Publication Data

US 2013/0104247 A1 Apr. 25, 2013

Related U.S. Application Data

(60) Provisional application No. 61/551,056, filed on Oct. 25, 2011.

(51) Int. Cl.
*H04L 9/32* (2006.01)

(52) U.S. Cl.
USPC .............................................. 726/27; 726/29

(58) Field of Classification Search
USPC ................... 380/46, 262; 713/150, 160, 165, 713/167–170, 181; 726/1–5, 26–30; 705/51
See application file for complete search history.

(56) References Cited

U.S. PATENT DOCUMENTS

| | | | |
|---|---|---|---|
| 6,330,670 B1 * | 12/2001 | England et al. | 713/2 |
| 7,266,569 B2 * | 9/2007 | Cutter et al. | 1/1 |
| 7,676,042 B2 * | 3/2010 | Okamoto et al. | 380/278 |

FOREIGN PATENT DOCUMENTS

EP 2302536 A1 3/2011

OTHER PUBLICATIONS

PCT/US2012/061351 Notification of Transmittal of the International Search Report and the Written Opinion of the international Searching Authority, or the Declaration dated Apr. 18, 2013.
H. Schulzrinne, Columbia University; E. Marocco, Telecom Italia; E. Ivov, SIP Communicator "Security Issues and Solutions in Peer-to-Peer Systems for Realtirne Communications"; Internet Research Task Force (I); Request for Comments 5765; ISSN: 2070-1721, Feb. 23, 2010, pp. 1-28; Geneva, Switzerland.
Jie Kong et al, "A Study of Pollution on Bit Torrent", Computer and Automation Engineering (ICCAE) 2010 The 2nd International Conference on IEEE, Piscataway, NJ, USA, Feb. 26, 2010, pp. 118-122; ISBN 978-1-4244-5585-0.
PCT/US2012/061351 Notification of Transmittal of the International Search Report and the Written Opinion of the International Searching Authority, or the Declaration dated Apr. 14, 2013.

(Continued)

*Primary Examiner* — Hosuk Song
(74) *Attorney, Agent, or Firm* — S. R. Santema

(57) ABSTRACT

A tracker node verifies content possession by a peer node in a peer-to-peer content distribution system. Upon receiving an announcement that a peer node claims to possess a content item, the tracker node in one embodiment obtains the content item, selects a random portion of the content item; formulates a challenge based on the random portion of the content item and determines an expected challenge response. The challenge may comprise, for example, a request for a hash of the random portion (or alternatively, a hash of the random portion and a random seed value). The tracker node issues the challenge to the announcing node and verifies the announcing node's possession of the content item if the challenge response from the announcing node matches the expected challenge response.

16 Claims, 5 Drawing Sheets

(56) References Cited

OTHER PUBLICATIONS

Schuizrinne, "Security Issues and Solutions in Peer-To-Peer Systems for Realtime Communications", Internet Research Task Force (IRTF), IETF, Standard Internet Society, Geneva Switzerland, Feb. 23, 2010.

Kong, "A Study of Pollution on BitTorrent", Computer and Automation Engineering (ICCAE), 2010 The 2nd International Conference on, IEEE, Piscataway, NJ, USA, Feb. 26, 2010.

* cited by examiner

US 8,621,650 B2

VERIFICATION OF CONTENT POSSESSION BY AN ANNOUNCING PEER IN A PEER-TO-PEER CONTENT DISTRIBUTION SYSTEM

CROSS-REFERENCE TO RELATED APPLICATIONS

The present application claims priority to the U.S. provisional patent application identified as Ser. No. 61/551,056, filed on Oct. 25, 2011, and titled, "Security Features for IMS-Based Content Distribution Services," the disclosure of which is incorporated by reference herein in its entirety.

The present application is related to U.S. patent application Ser. No. 13/344,985, titled "Verification of Integrity of Peer-Received Content in a Peer-to-Peer Content Distribution System," filed concurrently with the present application and assigned to the assignee of the present invention.

FIELD OF THE INVENTION

This invention relates generally to multimedia data security and, more particularly, to techniques for enhancing peer-to-peer content distribution services in a multimedia data network (e.g., including IMS-based networks).

BACKGROUND OF THE INVENTION

The demand for multimedia content distribution services (e.g., live streaming and content-on-demand) has increased tremendously in recent years in view of the development of fixed and mobile broadband technologies and more and more powerful mobile handsets. To satisfy this explosive demand, and to overcome bandwidth and quality limitations associated with the use of centralized media servers, there is a need to deploy more and more edge servers close to the end users. One way to address this need is to use peer-to-peer (P2P) technology.

Generally, peer-to-peer technology relies on a distributed set of end-nodes (called peers) to interact with each other and share resources to perform some task or objective so as to reduce demands on centralized resources. For example, in the case of multimedia content distribution, peer-to-peer technology may be utilized to offload storage and bandwidth demands from centralized servers to edge servers and, to the extent end user equipment capabilities permit, to user equipment (UEs). In one example, the edge servers can handle media content requests from UEs served locally, as well as requests from neighboring edge servers. Similarly, if the UE's capabilities permit, UEs can offer spare uplink bandwidth, storage space and other resources to other peer UEs. In addition, the content can be transmitted in a segmented manner and most of the traffic can be spread across the edge of the network. All this contributes to reduced storage and bandwidth demands on centralized servers, as well as improved system capability that scales well with the increasing number of edge servers and UEs.

However, although P2P is a promising model for multimedia content distribution services, there are security issues that still need to be addressed. In one aspect, there is a need to ensure reliable advertisement of content by end users (i.e., to verify that a peer who announces possession of particular content indeed possesses the advertised content.). False advertisement of non-existent content would lead to waste of resources and time at the client peer that might attempt to access the advertised content.

SUMMARY OF THE INVENTION

This problem is addressed and a technical advance is achieved in the art by a peer-to-peer content distribution system incorporating a tracker node logically connected to a plurality of peer nodes.

In one embodiment, there is provided a method carried out by the tracker node to verify content possession by a peer node, wherein the tracker node possesses or obtains access to the content. The method comprises receiving, from an announcing node of the peer nodes, a message including indicia of the content item claimed to be possessed by the announcing node; obtaining the content item; selecting a random portion of the content item; formulating a challenge based on the random portion of the content item; determining an expected challenge response; issuing the challenge to the announcing node; receiving a challenge response from the announcing node; and verifying the announcing node's possession of the content item if the challenge response matches the expected challenge response.

In another embodiment, there is provided a method carried out by the tracker node to verify content possession by a peer node, wherein the tracker node does not possess or obtain the content. The method comprises receiving, from an announcing node of the peer nodes, a message including indicia of a content item claimed to be possessed by the announcing node; identifying a content storage node possessing the content item; requesting a challenge from the content storage node; receiving the challenge from the content storage node, wherein the challenge is based on a random portion of the content item; receiving an expected challenge response from the content storage node; issuing the challenge to the announcing node; receiving a challenge response from the announcing node; and verifying the announcing node's possession of the content item if the challenge response matches the expected challenge response.

In yet another embodiment, there is provided an apparatus for verifying content possession by a peer node, in accordance with a peer-to-peer content distribution system including a plurality of peer nodes operably linked to a tracker node. The apparatus at the tracker node comprises a peer node interface; a content storage node interface; a memory; and at least one processor operably coupled to the peer node interface, content storage node interface and memory. The processor is configured to: (a) receive, from an announcing node of the peer nodes, a message including indicia of a content item claimed to be possessed by the announcing node; (b) obtain the content item; (c) select a random portion of the content item; (d) formulate a challenge based on the random portion of the content item; (e) determine an expected challenge response; (f) issue the challenge to the announcing node; (g) receive a challenge response from the announcing node; and (h) verify the announcing node's possession of the content item if the challenge response matches the expected challenge response.

In still another embodiment, there is provided an apparatus for verifying content possession by a peer node, in accordance with a peer-to-peer content distribution system including a plurality of peer nodes operably linked to a tracker node. The apparatus at the tracker node comprises a peer node interface; a content storage node interface; a memory; and at least one processor operably coupled to the peer node interface, content storage node interface and memory. The processor is configured to: (a) receive, from an announcing node of the peer nodes, a message including indicia of a content item claimed to be possessed by the announcing node; (b) identify a content storage node possessing the content item; (c)

request a challenge from the content storage node; (d) receive the challenge from the content storage node, wherein the challenge is based on a random portion of the content item; (e) receive an expected challenge response from the content storage node; (f) issue the challenge to the announcing node; (g) receive a challenge response from the announcing node; and (h) verify the announcing node's possession of the content item if the challenge response matches the expected challenge response.

BRIEF DESCRIPTION OF THE DRAWINGS

The foregoing and other advantages of the invention will become apparent upon reading the following detailed description and upon reference to the drawings in which.

DESCRIPTION OF THE PREFERRED
EMBODIMENT(S)

For ease of reference, the detailed description is divided as follows. Section I provides an overview of an IMS-based Peer-to-Peer Content Distribution System. Section II describes illustrative use cases of an IMS-based Peer-to-Peer Content Distribution System in which principles of the present invention may be applied. Section III describes a solution for verification of content possession by an announcing peer in an IMS-based P2P content distribution system.

I. Overview of an IMS-Based P2P Content
Distribution System

Internet Multimedia Subsystem (IMS), standardized by the $3^{rd}$ Generation Partnership Project (3GPP or 3GPP2), generally defines a next-generation architecture for providing multimedia services to converged networks (i.e., having mobile users as well as fixed-access users). IMS uses IP (Internet Protocol), and more specifically uses Session Initiation Protocol (SIP) as the communication protocol. Recently 3GPP has started studying how to use the IMS infrastructure to provide IMS-based Peer-to-Peer (P2P) Content Distribution Services.

Figure 1:
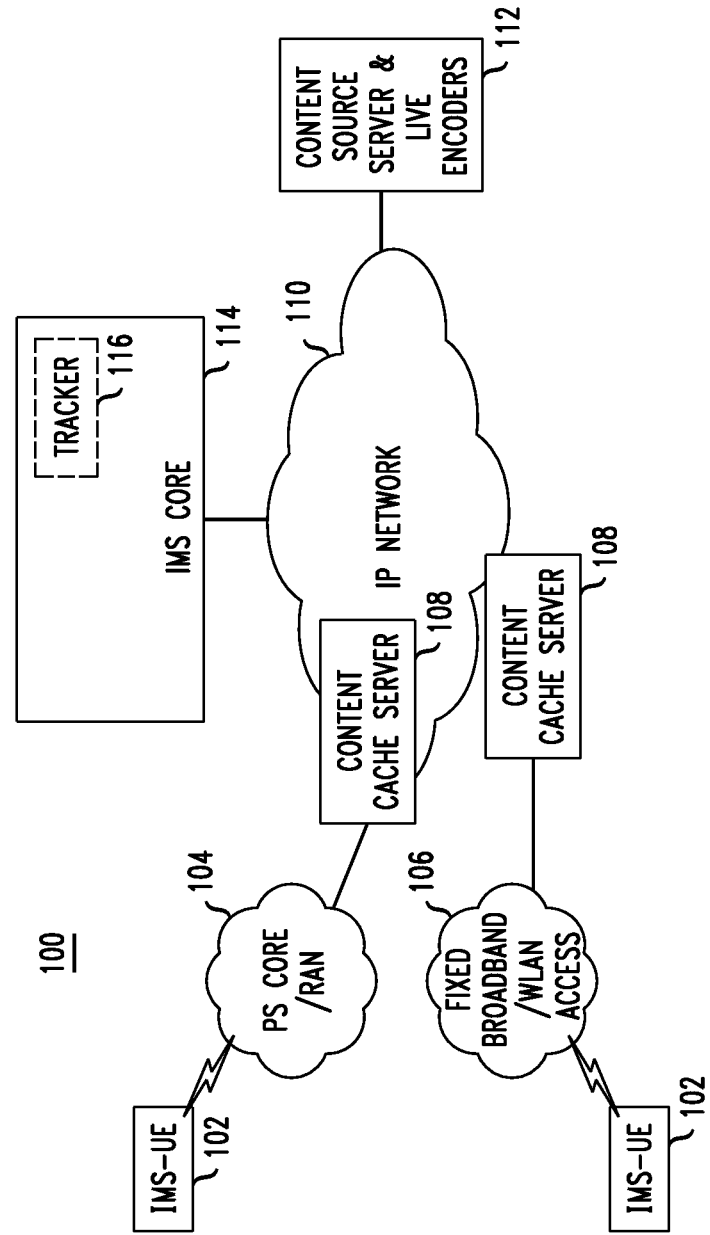
FIG. 1 illustrates an exemplary IMS-based communication network in which embodiments of the present invention may be implemented.

FIG. 1 illustrates an exemplary IMS-based communication network 100 for providing P2P Content Distribution Services. The communication network 100 includes one or more user platforms 102 interconnected by access networks 104, 106, to one or more content servers 108 of an IP Data Network 110. In the exemplary communication network 100, the content servers 108 comprise content cache servers at the edge of the IP network (i.e., close to the user platforms 102), in contrast to a centralized content source server 112, so as to provide multimedia content to end users while reducing demands on the centralized content source server 112.

The user platforms 102 ("IMS UE") may comprise, for example, laptop computers, desktop computers or mobile computing devices that are subject to operation by users to request multimedia content from the content servers 108; and if the UE capabilities permit, to store multimedia content and/or provide multimedia content to other user platforms.

The access networks 104, 106 comprise generally any type of access network, including wireless or fixed access networks. In the exemplary communication network 100, the access networks 104, 106 comprise a packet-switched/radio access network (PS Core/RAN) 104 and a fixed broadband/WLAN access network 106.

The centralized content source server 112 comprises generally any server, platform, system, application or function, nominally operated by a primary content provider and situated at a centralized location relative to the user platforms 102, that is adapted to generate, store and distribute primary content items. Examples of content providers include, for example, movie or television production or distribution companies and the primary content items may comprise, without limitation, movies, live streaming events, etc. Typically, to the extent that the primary content items may be divided into smaller segments, the centralized source server maintains or has access to the entirety (i.e., all segments) of the primary content.

The content cache servers 108 comprise generally any servers, platforms, systems, applications or functions, nominally situated at an edge of the network (i.e., close to the user platforms 102), adapted to receive multimedia content originating from the centralized content source server 112 for distribution to other content cache servers or user platforms. To the extent that content items may be segmented into portions, individual content cache servers 108 may receive and distribute less than the entirety of the primary content items maintained at the centralized content server.

The IP Data Network 110 comprises any packet-based network adapted to support content distribution between and among the content cache servers 108 and the centralized content source server 112 and the user platforms 102. In the exemplary communication network 100, the IP Data Network 110 is an IMS-based network and a portion of the network is referred to as the IMS Core 114. Generally, message traffic in the IMS-based communication network 100 may be characterized in either of two functional planes: a control plane for signaling traffic and a bearer plane for bearer traffic, such as multimedia content. Conceptually, the IMS Core 114 is the portion of the network for managing control traffic and the IP Data Network 110 is the portion of the network 100 for communicating bearer traffic.

The user platforms 102 communicate with the IMS Core 114 to accomplish, without limitation, SIP registrations, SIP session requests, user authentication; and, where applicable, to initiate content distribution services. To the extent the UE capabilities permit, individual user platforms 102 may participate in a peer-to-peer model to receive content from other user platforms and/or distribute content to other user platforms. In this context, user platforms participating to receive and/or distribute content are referred to as "Peers."

In one embodiment, the IMS Core 114 includes functional elements associated with content distribution services to accomplish, without limitation, client enrollment, content indexing, browsing and searching functionalities. In one aspect, the IMS Core includes a tracker node 116 that "tracks" content items possessed by various user platforms 102, by maintaining a list or the like of content items or segments possessed by the respective platforms. The tracker node might also track content items possessed by cache servers 108.

The tracker node 116 is generally defined as any hardware device, server, application or function logically connected to the user platforms 102, cache servers 108 and the content source server 112 that is operable to track content items possessed by the user platforms 102 and, according to embodiments of the present invention, to verify content that is claimed to be possessed by a user platform 108. The tracker node 116 may reside in a single device or platform or may be distributed among multiple devices or platforms. The logical hardware configuration (not shown) of the tracker node includes a processor and memory, a peer node interface and a content storage node interface for effecting communication with logically connected nodes and for performing tracking and verification functions. The tracking and verification functions may be performed, for example and without limitation, by the processor executing program code (e.g., including but not limited to operating system firmware/software and application software) stored in the memory.

II. Illustrative Use Cases of an IMS-Based P2P Content Distribution System

A. Use Case 1: Live Streaming Service for Multiple Online Users

Figure 2:
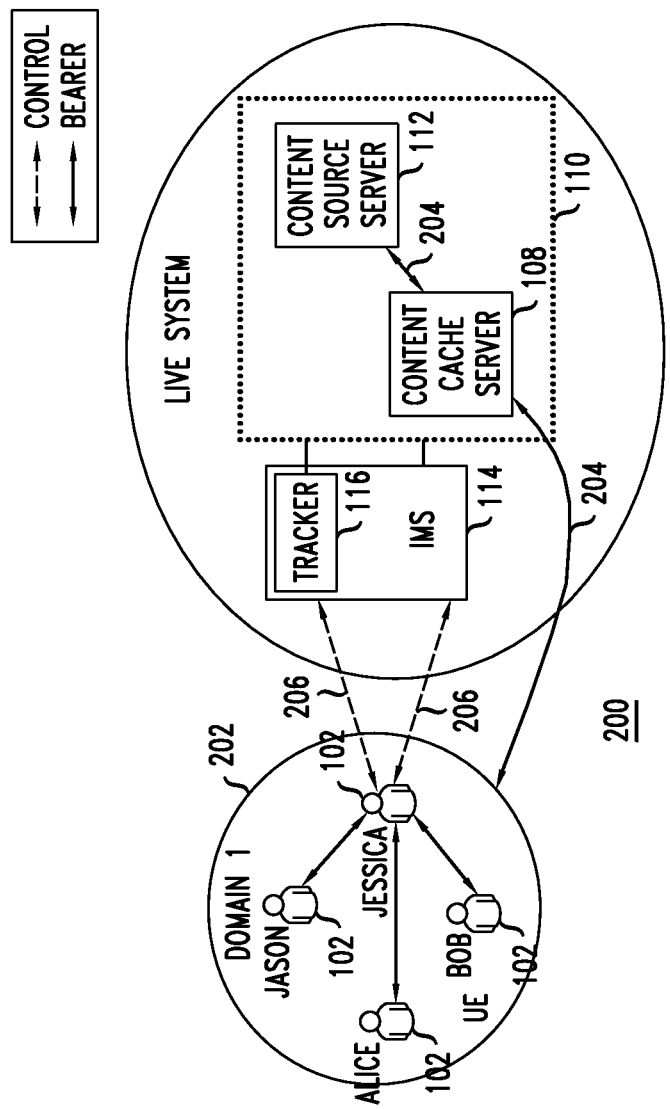
FIG. 2 depicts an example use of an IMS-based P2P Content Distribution System for providing live streaming of content to multiple online users.

FIG. 2 is an illustration of the use of an IMS-based P2P Content Distribution System 200 for Live Streaming of Content to Multiple Online Users. For convenience, like elements of FIG. 2 relative to FIG. 1 will be identified with the like reference numerals.

A plurality of user icons 102 represent multiple online users (and UE) operating within a logical domain 202 ("Domain 1"). The user icons 102 identify four IMS subscribers, Jessica, Bob, Jason and Alice. The domain 202 may comprise, for example, a geographical domain of an IMS service provider. The users 102 access multimedia service and content by communicating with an IP Data Network 110 and IMS Core 114. As described generally in relation to FIG. 1, the IP Data Network includes a content cache server 108 and a content source server 112 for distributing multimedia content; and the IMS Core 114 includes various functional elements, including, without limitation, a tracker 116 to perform functions such as client enrollment, content indexing, browsing and searching functions. Bearer traffic 204 is denoted by solid lines and control traffic 206 is denoted by dashed lines.

In the example use case, it is presumed that Jessica desires to watch a basketball game that starts at 8 pm and she notices from a pushed advertisement on her IMS streaming client (UE) that "IMS Live Channel" can broadcast the game. So she decides to watch the game from the IMS Live Channel.

(1) Around 8 pm, Jessica starts her IMS streaming client and begins the IMS registration process. After Jessica finishes her registration, the IMS streaming service delivers information of IMS live broadcast channels to the client. Jessica searches and selects the IMS live broadcast channel associated with the basketball game that she wants to watch from the list of IMS live broadcast channels, thereby indicating to the IMS streaming client that she wants to begin watching the basketball game.

(2) After receiving Jessica's request, the IMS streaming service can't provide access to IP multicast services for some reason (e.g., capacity bottleneck or the access router doesn't support IP multicast functionality), so it turns to application level multicast based on the Peer-to-Peer model to offer the basketball game with a small delay. The multicast Peer-to-Peer service queries the locations of the channel resources of the basketball game and sends to Jessica a list of the resource locations. For purpose of example, in the beginning only the content cache server 108 has cached the basketball game, so the IMS streaming service tells Jessica that she may stream the basketball game from the content cache server 108. Note that the streaming basketball game content is continuously being segmented into fixed-length parts.

(3) Jessica's UE downloads one or parts (i.e., segments) of the basketball game from the content cache server 108 (e.g., into cache memory of the UE) and Jessica begins to watch the basketball game.

(4) Jessica's UE periodically announces to the Tracker 116 which parts of the basketball game are presently maintained in its cached memory. The aspect of a UE announcing possession of content is referred to hereinafter as "advertising" of content. Where applicable, content cache servers and/or other UEs also advertise possession of content to the Tracker 116, so that the Tracker continuously (or nearly continuously) "tracks" which resources are maintaining which segments of content. Coincident to Jessica's advertisement of content, Jessica's UE receives an updated list of content cache servers and/or other peer UEs that have received some parts of the basketball game.

(5) As time goes by, more and more users in Domain 1 join the watching queue of the basketball game and the content cache server 108 begins to become overloaded. For purpose of example, presume that as of the latest Tracker update (step 4), Jessica's UE knows that Jason, Alice and Bob's UEs have some cached parts of the basketball game. Accordingly, Jessica's UE may attempt to download some parts of the basketball game from Jason, Alice and/or Bob's UE for more efficient content distribution and to decrease the workload of the content cache server 108.

B. Use Case 2: Content-on-Demand Service for Multiple Online Users

Figure 3:
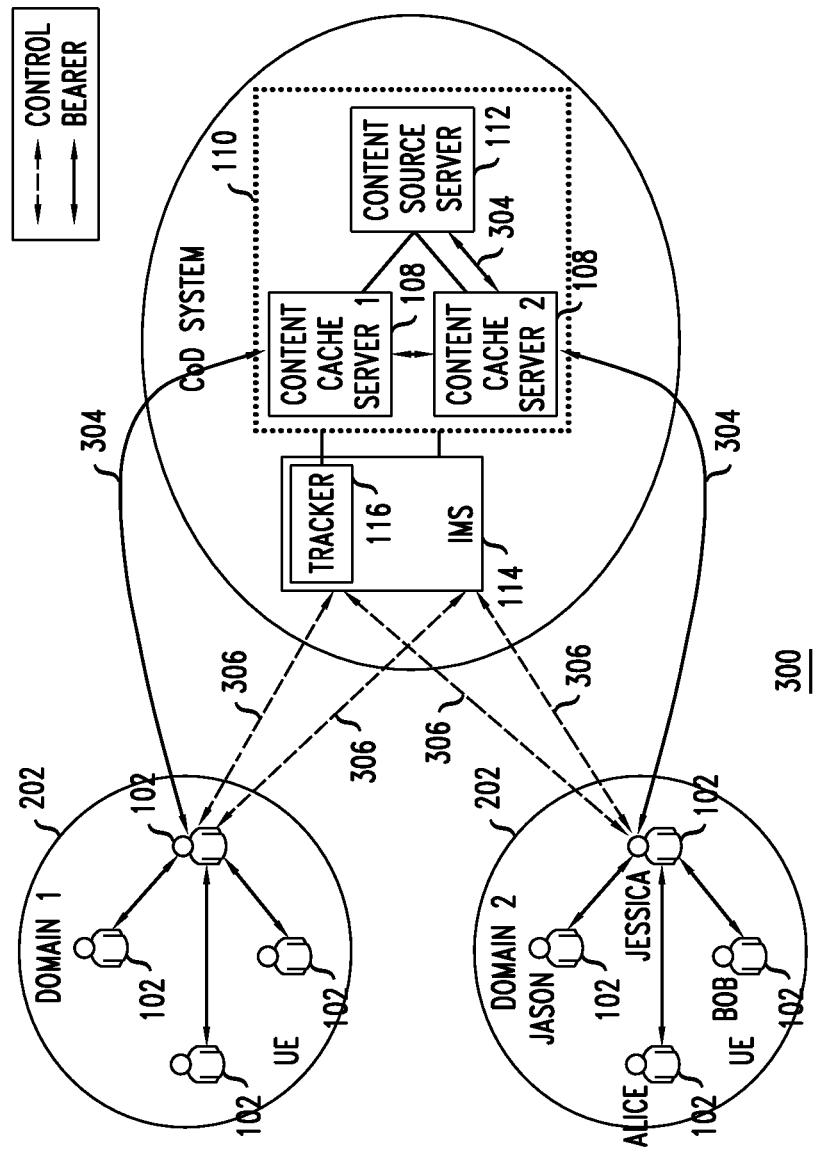
FIG. 3 depicts an example use of an IMS-based P2P Content Distribution System for providing Content-on-Demand Service for multiple online users.

FIG. 3 is an illustration of the use of an IMS-based P2P Content Distribution System 300 for providing Content-on-Demand Service for multiple online users. For convenience, like elements of FIG. 3 relative to FIG. 1 and FIG. 2 will be identified with the like reference numerals.

A plurality of user icons 102 represent multiple online users (and UE) operating within a plurality of logical domains 202 (as shown, "Domain 1" and "Domain 2"). The user icons 102 identify four IMS subscribers in each domain 202, (unnamed in Domain 1 and named Jessica, Bob, Jason and Alice in Domain 2). The domains 202 may comprise, for example, separate logical domains of two different IMS service providers or separate geographic domains of a single service provider. The users 102 access multimedia service and content by communicating with an IP Data Network 110 and IMS Core 114. As shown in FIG. 3, the IP Data Network includes two content cache servers 108 ("Content Cache Server 1" and "Content Cache Server 2") and a content source server 112 for distributing multimedia content; and the IMS Core 114 includes various functional elements, including, without limitation, a tracker 116 to perform functions such as client enrollment, content indexing, browsing and searching functions. Bearer traffic 304 is denoted by solid lines and control traffic 306 is denoted by dashed lines.

In the example use case, it is presumed that Jessica is an IMS subscriber within Domain 2 and desires to watch an on-demand movie on her UE 102 (e.g., from "IMS Online Movie Theatre").

(1) Jessica starts her IMS P2P application client and begins the IMS registration process. After Jessica finishes her registration, the IMS P2P application delivers program information (e.g., a list/menu of on-demand programs) to the client. Jessica searches and selects a movie from the program list to indicate to the P2P application that she wants to begin watching the movie.

(2) After receiving Jessica's request, the P2P application queries the locations of the film storage resources of the selected movie and sends back to Jessica a list of the resource locations. For purpose of example, it is presumed that the selected movie is segmented into 10 parts (e.g., Part 1, Part 2, etc.), the content source server 112 has all of the 10 parts and the content cache servers 108 have only an initial portion (e.g., Part 1 and Part 2) of the 10 parts. Presume that responsive to Jessica's request, the P2P application tells Jessica that she may download the movie from Content Cache Server 2.

(3) Jessica's UE queries the Content Cache Server 2 to determine which parts of the movie are available to download from the Content Cache Server 2. The Content Cache Server 2 informs Jessica's UE that Parts 1 and 2 are available to download.

(4) Jessica's UE downloads Parts 1 and 2 from the Content Cache Server 2 (e.g., into cache memory of the UE) and Jessica begins to watch the movie.

(5) Jessica's UE periodically announces (or "advertises") to the Tracker 116 which parts of the movie are presently maintained in its cached memory and receives updated information from the Tracker 116 that identifies where other parts of the movie have been distributed (for example, Content Cache Servers or peer UEs). When Jessica finishes watching Parts 1 and 2 (i.e., retrieved from the Content Cache Server 2), Jessica's UE may retrieve the rest of the parts from the Content Source Server 112 or where indicated by the Tracker 116.

(6) As time goes by, more and more users around Jessica (i.e., in Domain 2) join the watching queue of the movie and they receive Parts 1 and 2 from the Content Cache Server 2 and further parts from the Content Source Server 112, at least initially, causing the Content Source Server to become congested. Fortunately, from step (5), the users may periodically become aware of alternative storage resources of the movie as indicated by the Tracker 116, and may access those resources to relieve the workload of the Content Source Server 112. For purpose of example, presume that as of the latest Tracker update, the users in Jessica's domain know that further parts of the movie may now be obtained from Content Cache Server 1 and they begin to download parts of the movie from Content Cache Server 1.

(7) More time goes by, and still more users in Domain 1 and 2 join the watching queue of the movie and now Content Cache Servers 1 and 2 are getting overloaded. Now presume that as of the latest Tracker update, Jessica's UE knows that further parts of the movie may be obtained from her three neighbor UEs Jason, Bob and Alice, so Jessica's UE tries to download parts of the movie from one or more of the neighbor UEs.

III. Problem Statement and Solution

From the description of the use cases above, it is evident that an important aspect of P2P content distribution service is the advertisement of content possession from UEs and/or content cache servers, where applicable, to the Tracker, which maintains a list of UEs and/or content cache servers possessing content at any given time. It follows that a major security threat exists in the possible false advertisement of content (e.g., by a malicious peer that does not possess the advertised content), which could lead to false information maintained by the Tracker. To address this threat, embodiments of the present invention are directed to verification of content possession by an announcing peer (i.e., determining the truth or falsity of advertised content possession) in a P2P content distribution system.

Figure 4:
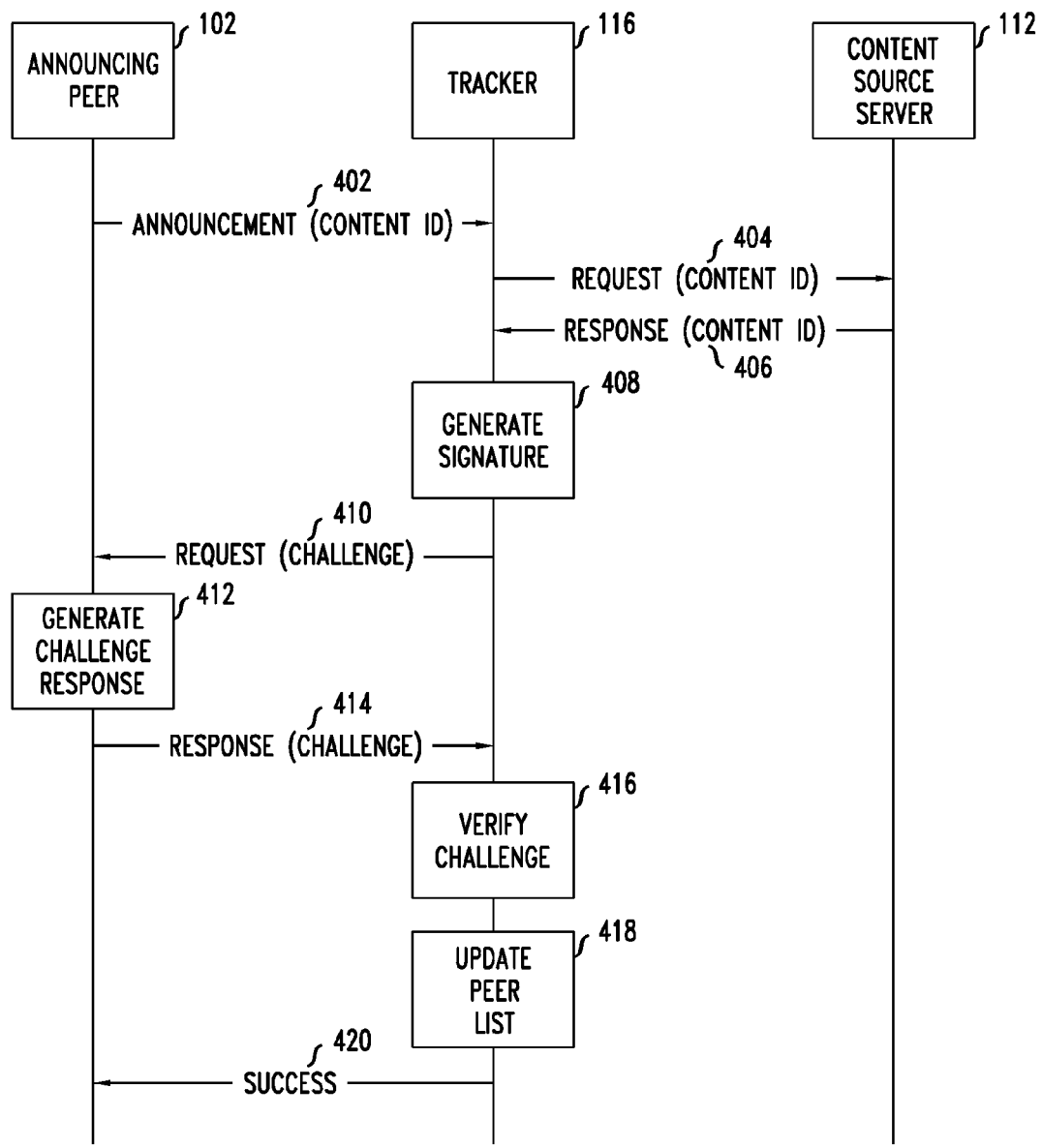
FIG. 4 illustrates a message sequence for verification of content possession by an announcing peer according to an embodiment of the invention.

Referring now to FIG. 4, a message sequence is shown for verification of content possession by an announcing peer according to an embodiment of the invention. The steps of FIG. 4 are performed, where applicable, by an announcing peer 102, the Tracker 116 and the Content Source Server 112 of a P2P content distribution system such as shown in FIG. 1, FIG. 2 or FIG. 3.

At step 402, the Tracker 116 receives an announcement from an announcing peer 102 indicating that the announcing peer possesses some item(s) of content. Advantageously, the announcement includes indicia of the content item and/or segments that are claimed to be possessed by the announcing peer. As shown, for example, the announcement includes a "ContentID" from which the Tracker may ascertain the advertised content items and/or segments. For example, with reference to the use case described in relation to FIG. 3, an announcement from Jason's UE may include a ContentID that corresponds to Part 3 of Jessica's selected movie; and accordingly, the Tracker recognizes that Jason's UE claims to possess Part 3 of the movie.

In one embodiment, to verify content possession by the announcing peer, the Tracker needs to possess the content itself or it needs means and information where to obtain the content, for example, it may obtain the content from the Content Source Server 112 by means of a request that includes the "ContentID" or other indicia of the requested content. Accordingly, once the Tracker receives the announcement that a peer possesses some content, it may first check to see if it possesses the content itself; and if the Tracker does not possess the content, it will use available means to obtain the content (e.g., from the Content Source Server). In the message sequence of FIG. 4, it is presumed the Tracker does not itself possess the advertised content; and at step 404, the Tracker requests the advertised content from the Content Source Server 112. The request includes the "ContentID" or other indicia of the content. At step 406, the Tracker receives the requested content from the Content Source Server.

Once the content is obtained, the Tracker will issue a Challenge to the announcing peer. This challenge for example can be a request for a hash of the content (e.g., the entire content) or in the preferred embodiment, a hash of a random part of the content. As is well known, a hash is a cryptographic function that takes as input an arbitrary block of data and produces as output a hash value; and two inputs will not result in the same hash value unless the two inputs are identical.

A Challenge based on a random part of the content is based on creating a random question about the content itself which only the real possessor of the content can correctly answer. For example, using a book analogy, a challenger may ask the claimed possessor of a particular book for the seventh letter of twentieth word on page 72 of the book. Without really having the book, the claimed possessor would not be able to answer the question and it would be computationally infeasible for the claimed possessor to attempt to anticipate the possible random questions and to create and store the answers. In the case of digital multimedia content, a challenger may ask the advertising peer to confirm possession of a specific block of the content, where the beginning of the block and the length of the block are randomly selected. A good representation of the answer would be a hash of this block and in view of the randomness of the question, the hash need not be secure.

At step 408, in accordance with the preferred embodiment, the Tracker randomly selects a block of content (e.g., a block beginning at a specified bit and having a specified length) and generates a digital signature of the selected block as the basis of a Challenge to the announcing peer. That is, the digital signature defines an expected response to the challenge. In one embodiment, the digital signature is derived by performing a hash of the randomly selected block. As noted, in view of the randomness of the block, the hash need not be secure. For example, in the case where the announcing peer claims to possess Part 3 of a selected movie, the Tracker selects a random block from Part 3 of the movie beginning at specified bit and having a specified length and generates a signature comprising a hash of the selected block.

Alternatively, at step 408, to achieve an additional layer of security and prevent replay attacks, the Tracker may generate a random seed value to be included in the Challenge. For example and without limitation, the Tracker may generate a digital signature by performing a hash of the randomly selected block combined with the random seed value.

At step 410, the Tracker will issue a Challenge to the announcing peer. This Challenge for example can be a request to hash the random block (or as may be appropriate, a request to hash the random block combined with a random seed value) selected at step 408. The Challenge identifies the random block, for example by indicating a beginning bit number and length of the block (and where appropriate, identifies the random seed value). At step 412, the announcing peer generates a Challenge Response including the requested hash and at step 414 sends the Challenge Response to the Tracker.

At step 416, the Tracker verifies the Challenge, for example, by comparing the Challenge Response received at step 414 to the expected response generated by itself at step 408. If the Challenge Response does not match the expected response (i.e., the digital signatures are not the same) the verification fails and the Tracker discards the announcement. Optionally, the Tracker may inform the announcing peer about the failed verification. If the Challenge Response matches the expected response (i.e., the digital signatures are the same), the verification is successful and at step 418, the Tracker updates the Peer List to indicate that the announcing peer is confirmed to possess the advertised content. At step 420, the Tracker may inform the announcing peer about the successful verification.

Figure 5:
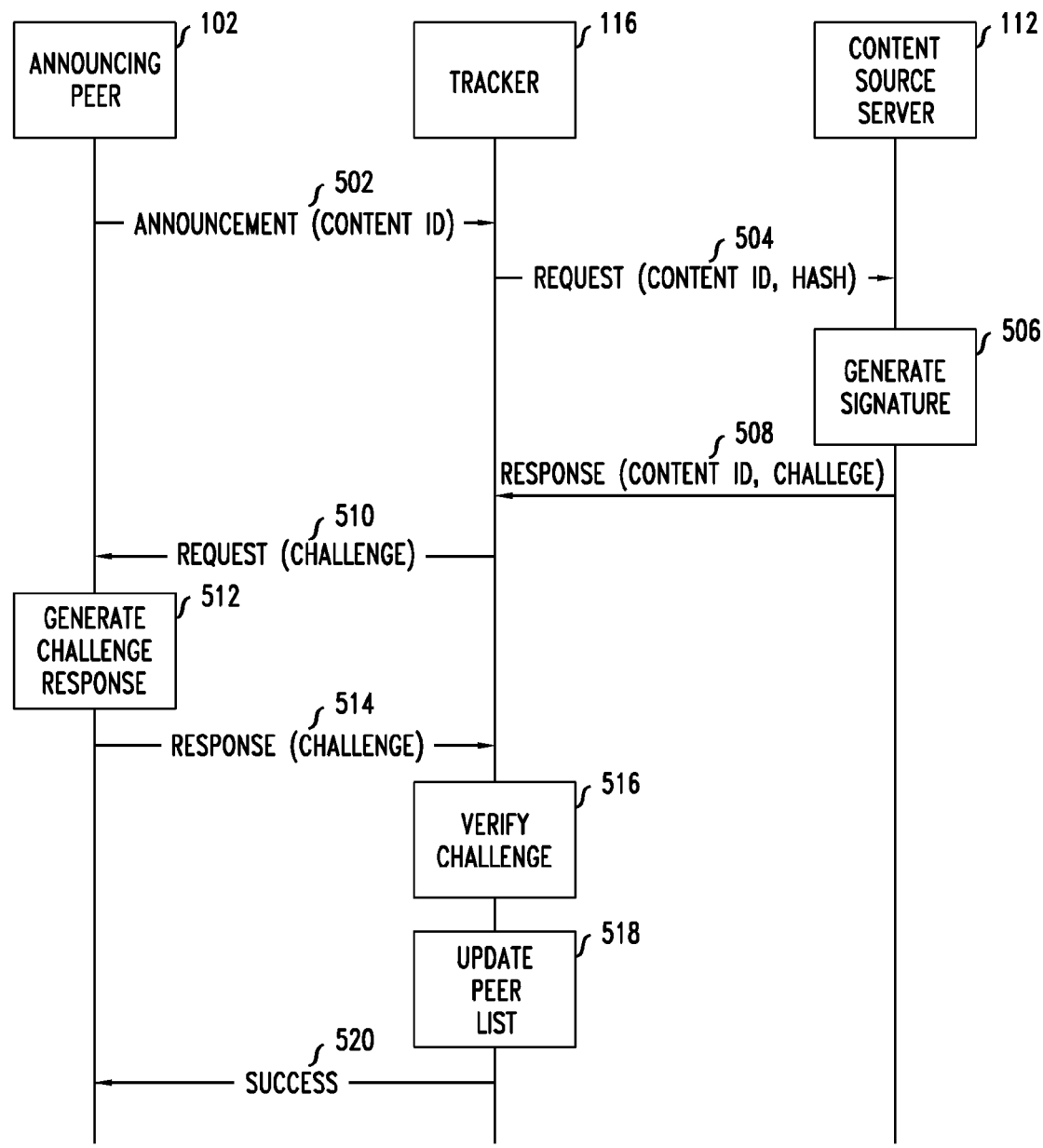
FIG. 5 illustrates a message sequence for verification of content possession by an announcing peer according to another embodiment of the invention.

FIG. 5 shows a message sequence for verification of content possession by an announcing peer according to an alternative embodiment of the invention. The steps of FIG. 5 are performed, where applicable, by an announcing peer 102, the Tracker 116 and the Content Source Server 112 of a P2P content distribution system such as shown in FIG. 1, FIG. 2 or FIG. 3.

At step 502, the Tracker 116 receives an announcement from an announcing peer 102 indicating that the announcing peer possesses some item(s) of content. Advantageously, the announcement includes indicia of the content item and/or segments that are claimed to be possessed by the announcing peer. As shown, for example, the announcement includes a "ContentID" from which the Tracker may ascertain the advertised content items and/or segments.

In the embodiment of FIG. 5, to verify content possession by the announcing peer, the Tracker need not possess the content itself or obtain the content from the Content Source Server 112. Presuming that the Tracker does not possess the content, instead of obtaining the content from the Content Source Server 112, the Tracker at step 504 can request the Challenge. The Challenge for example can be a request for a hash of the content (e.g., the entire content) or in the preferred embodiment, a hash of a random part of the content.

At step 506, in accordance with the preferred embodiment, the Content Source Server 112 randomly selects a block of content (e.g., a block beginning at a specified bit and having a specified length) of the advertised content and generates a digital signature of the selected block as the basis of a Challenge. That is, the digital signature defines an expected response to the challenge. In one embodiment, the digital signature is derived by performing a hash of the randomly selected block. The hash need not be secure in view of the randomness of the content. For example, in the case where the Request received from the Tracker at step 504 specifies Part 3 of Jessica's selected movie, the Content Source Server may select a random block from Part 3 of the movie beginning at specified bit and having a specified length and generates a signature comprising a hash of the selected block. Optionally, the Tracker may select the random block and specify the random block in the Request.

Alternatively, at step 506, to achieve an additional layer of security and prevent replay attacks, the Content Source Server (or optionally, the Tracker) may generate a random seed value to be included in the Challenge. For example and without limitation, the Content Source Server may generate a digital signature by performing a hash of the randomly selected block combined with the random seed value.

At step 508, the Content Source Server sends to the Tracker a Response including the requested Challenge and the expected response (e.g., digital signature); and the Tracker stores the challenge and expected response. The Challenge identifies the random block, for example by indicating a beginning bit number and length of the block (and where appropriate, identifies the random seed value). This tremendously saves resources, both bandwidth and storing capacity, relative to the embodiment of FIG. 4 since the digital signature will almost certainly contain less data than an item of multimedia content.

At step 510, the Tracker will issue the Challenge to the announcing peer. This Challenge for example can be a request to hash the random block (or as may be appropriate, a request to hash the random block combined with a random seed value) computed by the Content Source Server at step 506 and received and stored by the Tracker at step 508. At step 512, the announcing peer generates a Challenge Response including the requested hash and at step 514 sends the Challenge Response to the Tracker.

At step 516, the Tracker verifies the Challenge, for example, by comparing the Challenge Response received from the announcing peer at step 514 to the expected response received and stored by the Tracker at step 508. If the Challenge Response does not match the expected response (i.e., the digital signatures are not the same) the verification fails and the Tracker discards the announcement. Optionally, the Tracker may inform the announcing peer about the failed verification. If the Challenge Response matches the expected response (i.e., the digital signatures are the same), the verification is successful and at step 518, the Tracker updates the Peer List to indicate that the announcing peer is confirmed to possess the advertised content. At step 520, the Tracker may inform the announcing peer about the successful verification.

FIGS. 1-5 and the foregoing description depict specific exemplary embodiments of the invention to teach those skilled in the art how to make and use the invention. The described embodiments are to be considered in all respects only as illustrative and not restrictive. The present invention may be embodied in other specific forms without departing from the scope of the invention which is indicated by the appended claims. All changes that come within the meaning and range of equivalency of the claims are to be embraced within their scope.

For example, embodiments are described herein with reference to an IMS-based network topology. However, it is to be appreciated that principles of the invention, while applicable to an IMS-based network, are not intended to be so limited. Rather, embodiments of the present invention are generally applicable to any type of communication network or hybrid network that relies upon P2P technology to facilitate multimedia content distribution.

What is claimed is:

1. In a peer-to-peer content distribution system including a plurality of peer nodes operably linked to a tracker node, a method, carried out by a processor associated with the tracker node, comprising:
   receiving, from an announcing node of the peer nodes, a message including indicia of a content item claimed to be possessed by the announcing node;
   obtaining the content item;
   selecting a random portion of the content item;
   formulating a challenge based on the random portion of the content item;
   determining an expected challenge response;
   issuing the challenge to the announcing node;
   receiving a challenge response from the announcing node; and
   verifying the announcing node's possession of the content item if the challenge response matches the expected challenge response.

2. The method of claim 1, wherein the step of formulating a challenge comprises formulating a request to hash the selected random portion of the content, while identifying this selected portion of the content;
   the step of determining an expected challenge response comprises performing the hash of the selected random portion of the content, yielding the expected challenge response; and
   the step of issuing the challenge comprises requesting the announcing peer to perform the hash of the random portion of the content.

3. The method of claim 1, wherein the step of formulating a challenge comprises formulating a request to hash the selected random portion of the content, while identifying this selected portion of the content, and generating a random seed value;
   the step of determining an expected challenge response comprises performing the hash of the selected random portion of the content as well as the random seed, yielding the expected challenge response; and
   the step of issuing the challenge comprises requesting the announcing peer to perform the hash of the random portion of the content and the random seed.

4. The method of claim 1, wherein the tracker possesses the content item, the step of obtaining the content item comprises the tracker retrieving the content item.

5. The method of claim 1, wherein the tracker does not possess the content item, the step of obtaining the content item comprising the tracker:
   identifying a content storage node possessing the content item;
   requesting the content item from the content storage node; and
   receiving the content item from the content storage node.

6. In a peer-to-peer content distribution system including a plurality of peer nodes operably linked to a tracker node, a method, carried out by a processor associated with the tracker node, comprising:
   receiving, from an announcing node of the peer nodes, a message including indicia of a content item claimed to be possessed by the announcing node;
   identifying a content storage node possessing the content item;
   requesting a challenge from the content storage node;
   receiving the challenge from the content storage node, wherein the challenge is based on a random portion of the content item;
   receiving an expected challenge response from the content storage node;
   issuing the challenge to the announcing node;
   receiving a challenge response from the announcing node; and
   verifying the announcing node's possession of the content item if the challenge response matches the expected challenge response.

7. The method of claim 6, wherein the step of requesting the challenge comprises requesting a challenge to hash a random portion of the content item, while identifying this random portion of the content;
   the step of receiving an expected challenge response comprises receiving a result of the hash of the random portion performed by the content storage node; and
   the step of issuing the challenge comprises requesting the announcing peer to perform the hash of the random portion.

8. The method of claim 7, wherein the random portion is selected by the content storage node.

9. The method of claim 6, wherein the step of requesting the challenge comprises requesting a challenge to hash the random portion of the content, while identifying this random portion of the content, and generating a random seed value;
   the step of receiving an expected challenge response comprises receiving a result of the hash of the selected random portion of the content as well as the random seed; and
   the step of issuing the challenge comprises requesting the announcing peer to perform the hash of the random portion of the content and the random seed.

10. The method of claim 9, wherein the random portion and the random seed value is selected by the content storage node.

11. Apparatus for verifying content possession by a peer node, in accordance with a peer-to-peer content distribution system including a plurality of peer nodes operably linked to a tracker node, the apparatus at the tracker node comprising:
    a peer node interface;
    a content storage node interface;
    a memory; and
    at least one processor operably coupled to the peer node interface, content storage node interface and memory and configured to:
    (a) receive, from an announcing node of the peer nodes, a message including indicia of a content item claimed to be possessed by the announcing node;
    (b) obtain the content item;
    (c) select a random portion of the content item;
    (d) formulate a challenge based on the random portion of the content item;
    (e) determine an expected challenge response;
    (f) issue the challenge to the announcing node;
    (g) receive a challenge response from the announcing node; and
    (h) verify the announcing node's possession of the content item if the challenge response matches the expected challenge response.

12. The apparatus of claim 11, wherein the processor at part (d) is configured to formulate a request to hash the selected random portion of the content, while identifying this selected portion of the content; at part (e) is configured to perform the hash of the selected random portion of the content, yielding the expected challenge response; and at part (f) is configured to request the announcing peer to perform the hash of the random portion.

13. The apparatus of claim 11, wherein the processor at part (d) is configured to formulate a request to hash the selected random portion of the content, while identifying this selected portion of the content, and generating a random seed value; at part (e) is configured to perform the hash of the selected random portion of the content as well as the random seed value, yielding the expected challenge response; and at part (f) is configured to request the announcing peer to perform the hash of the random portion and the random seed.

14. Apparatus for verifying content possession by a peer node, in accordance with a peer-to-peer content distribution system including a plurality of peer nodes operably linked to a tracker node, the apparatus at the tracker node comprising:
   a peer node interface;
   a content storage node interface;
   a memory; and
   at least one processor operably coupled to the peer node interface, content storage node interface and memory and configured to:
   (a) receive, from an announcing node of the peer nodes, a message including indicia of a content item claimed to be possessed by the announcing node;
   (b) identify a content storage node possessing the content item;
   (c) request a challenge from the content storage node;
   (d) receive the challenge from the content storage node, wherein the challenge is based on a random portion of the content item;
   (e) receive an expected challenge response from the content storage node;
   (f) issue the challenge to the announcing node;
   (g) receive a challenge response from the announcing node; and
   (h) verify the announcing node's possession of the content item if the challenge response matches the expected challenge response.

15. The apparatus of claim 14, wherein the processor at part (c) is configured to request a challenge to hash a random portion of the content item, while identifying this random portion of the content; at part (e) is configured to receive a result of the hash of the random portion performed by the content storage node; and at part (f) is configured to request the announcing peer to perform the hash of the random portion.

16. The apparatus of claim 14, wherein the processor at part (c) is configured to request a challenge to hash a random portion of the content item, while identifying this random portion of the content, and generating a random seed value; at part (e) is configured to receive a result of the hash of the random portion and the random seed performed by the content storage node; and at part (f) is configured to request the announcing peer to perform the hash of the random portion and the random seed.

* * * * *